United States Patent
Sommerfeld et al.

(10) Patent No.: US 7,156,065 B2
(45) Date of Patent: Jan. 2, 2007

(54) TRIGGER CIRCUIT FOR AN ENGINE STARTER RELAY

(75) Inventors: Jens Sommerfeld, Wimsheim (DE); Gregor Seiler, Freiberg A.N. (DE)

(73) Assignee: Robert Bosch GmbH, Stuttgart (DE)

( * ) Notice: Subject to any disclaimer, the term of this patent is extended or adjusted under 35 U.S.C. 154(b) by 96 days.

(21) Appl. No.: 10/940,384

(22) Filed: Sep. 13, 2004

(65) Prior Publication Data

US 2005/0061282 A1 Mar. 24, 2005

(30) Foreign Application Priority Data

Sep. 16, 2003 (DE) ................ 103 43 059

(51) Int. Cl.
*F02N 11/08* (2006.01)
(52) U.S. Cl. .................................. 123/179.3
(58) Field of Classification Search .......... 123/179.3, 123/179.1, 179.25, 179.14; 701/104, 103, 701/105, 113, 114, 115; 318/445, 431, 430
See application file for complete search history.

(56) References Cited

U.S. PATENT DOCUMENTS

| 5,287,831 | A | * | 2/1994 | Andersen et al. | ....... 123/179.3 |
| 5,729,456 | A | * | 3/1998 | Boisvert et al. | ....... 123/179.21 |
| 6,104,157 | A | * | 8/2000 | Kramer et al. | ............... 318/445 |
| 6,148,781 | A | * | 11/2000 | Boegner et al. | ......... 123/179.3 |
| 6,456,034 | B1 | * | 9/2002 | Vilou | ....................... 123/179.3 |
| 6,795,766 | B1 | * | 9/2004 | Theisen et al. | ........... 123/179.3 |
| 2002/0183918 | A1 | * | 12/2002 | Theisen et al. | ............. 701/113 |

FOREIGN PATENT DOCUMENTS

DE    10005778 A1 *  8/2001

\* cited by examiner

*Primary Examiner*—Stephen K. Cronin
*Assistant Examiner*—Arnold Castro
(74) *Attorney, Agent, or Firm*—Kenyon & Kenyon LLP

(57) ABSTRACT

A trigger circuit for an engine starter relay includes: (a) a switching device for switching an output of the engine starter relay to a reference potential and for activating the engine starter relay as a function of a trigger signal, which is applied to a trigger input of the switching device; (b) a first logic circuit for the logical linking of a first digital signal of a computer device and a second digital signal of an operating device; (c) a second logic circuit for logically linking the output signal of the first logic circuit with the first digital signal; and a storage device for temporarily storing the state at the outputs of the first and second logic circuit, an output of the storage device being connected with the trigger input of the switching device, the activation of an engine starter relay being ensured in the event that the supply voltage at a computer device falls below a specified value with the result of activating a reset signal.

10 Claims, 1 Drawing Sheet

TRIGGER CIRCUIT FOR AN ENGINE STARTER RELAY

FIELD OF THE INVENTION

The present invention relates to a trigger circuit for an engine starter relay and in particular to a starter-latch circuit for activating a starter relay via a switching device.

BACKGROUND INFORMATION

Today, a starter for an internal combustion engine such as a diesel or gasoline engine is generally triggered via a starter relay. So as not to connect the high current, momentarily measuring several hundred amperes, directly through via a semiconductor switch, a relay is used, which can be activated via a comparatively small current using a switching device, preferably a field-effect transistor (FET). Today's control units, as they are used particularly in motor vehicles such as passenger cars, are generally designed for an operating voltage range between 6 V and 16 V. In a voltage range below 6 V, the functioning of the control unit, i.e. the triggering of the starter relay, is not guaranteed.

In the case of known control units, it is possible that, due to a momentary drop in the battery voltage below 6 V as a result of the high electrical load during the starting process, the vehicle electronic system is reset due to the low internal resistance of the starter, which has the undesired effect of also switching off the switching device for activating the starter relay. On account of the reset of the electronic system, however, the momentary voltage drop, possibly in the millisecond range, results in a significantly longer interruption of the starter relay activation circuit. Consequently, the starter relay drops out, and the starting process of the engine is aborted possibly just as the engine was about to start, even though only a momentary voltage drop caused the control unit to reset.

SUMMARY OF THE INVENTION

The trigger circuit according to the present invention for an engine starter relay has the advantage over the related art that in the case of a control unit reset, e.g. due to a drop in the supply voltage, it maintains the state of the trigger switching device of the starter relay until the control unit is reactivated following the reset.

Storing the state prior to a control unit reset thus makes it possible to continue the starting process in spite of a control unit reset, caused for example by a momentary voltage drop in the process of starting the engine.

The idea at the basis of the present invention is essentially to ensure the functioning of the starter output with the aid of a storage device so as to provide for a continuous activation of the starter even at a voltage below 6 V, at which, for example, a processor of the control unit or the entire control unit is deactivated, i.e. reset. To achieve this objective, by simple means a starter-latch device is provided, which can be implemented cost-effectively.

The problem at the basis of the present invention is solved in particular by providing a trigger circuit for an engine starter relay having: (a) a switching device for switching an output of the engine starter relay to a reference potential and for activating the engine starter relay as a function of a trigger signal, which is applied to a trigger input of the switching device; (b) a first logic circuit for the logical linking of a first digital signal of a computer device and a second digital signal of an operating device; (c) a second logic circuit for logically linking the output signal of the first logic circuit with the first digital signal; and (d) a storage device for temporarily storing the state at the outputs of the first and second logic circuits, an output of the storage device being connected with the trigger input of the switching device, (e) an activated engine starter relay being ensured in the event that the supply voltage at a computer device falls below a specified value with the result of an activated reset signal.

According to a preferred further development, the first and second logic circuits each have a NAND gate. This offers the advantage of a simple implementation of the logic circuit.

According to an additional preferred refinement, the switching device features a transistor, preferably a FET. A field effect transistor as a switching device has the advantage of an efficient, low-loss switching device, which can be triggered by simple means.

According to another preferred refinement, the storage device features a flip-flop, preferably two NAND gates. In this manner, a cost-effective state storage device can be advantageously implemented.

According to another preferred refinement, the flip-flop has a third NAND gate, which on the input side is connected to the output of the first logic circuit and the output of a fourth NAND gate, the fourth NAND gate being connected on the input side to the output of the third NAND gate and the output of the second logic circuit. A simple, cost-effective flip-flop on the basis of two NAND gates is thus advantageously provided.

According to another preferred refinement, a diode is interposed between the output of the engine starter relay and the switching device, and preferably a capacitor is interposed between the output of the engine starter relay and the reference potential. This has the advantage of a reverse-polarity protection (diode) and an ESD protection device (capacitor).

According to another preferred refinement, a first resistor is interposed between the output of the first logic circuit and an input of the storage device, and behind the first resistor, a capacitor is interposed parallel to a second resistor between the input of the storage device and the reference potential. The second resistor is advantageously used to provide a defined potential, the second resistor and the capacitor providing for a time delay. Resets present or appearing for periods shorter than 22 µs are thus ignored.

According to another preferred refinement, a signal output is provided as a diagnostic interface for a computer device between the starter relay output and the switching device. Via a diagnostic bar, it is thus possible to ensure that a drop-out of the relay, i.e. of the load in this activation circuit, is detected and that a short circuit to the reference potential (ground) or to a voltage supply (battery) is detected.

According to another preferred refinement, the trigger circuit for activating an engine starter relay is provided in a passenger car.

DETAILED DESCRIPTION

Figure 1:
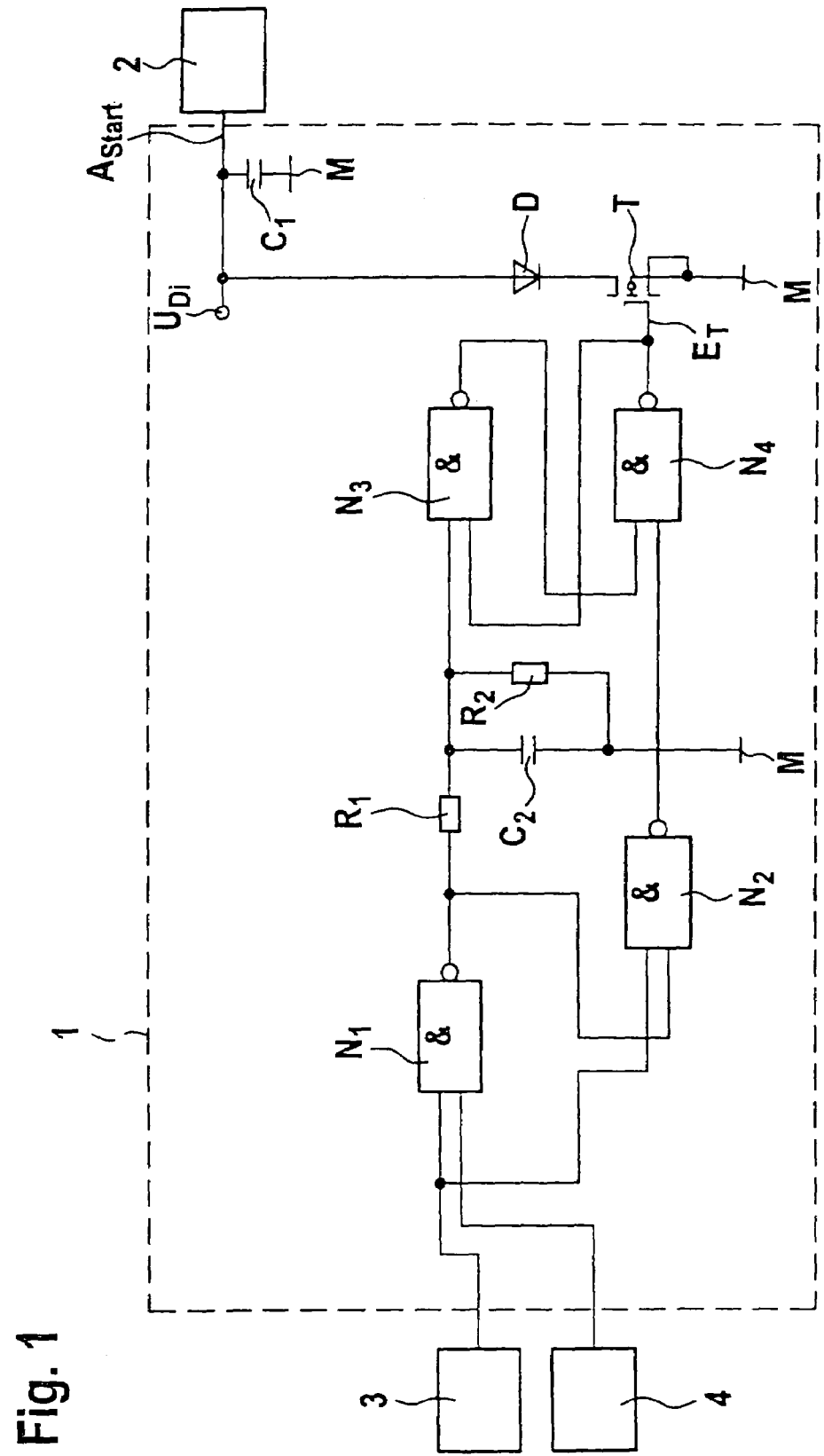
FIG. 1 shows a schematic block diagram of a trigger circuit for illustrating a specific embodiment of the present invention.

FIG. 1 shows a schematic block diagram of a trigger circuit according to a specific embodiment of the present invention. A first signal $U_{RES}$ from a computer device 3 and a second signal $U_{START}$ from an operating device 4 are linked with each other at a first logic circuit $N_1$, preferably a NAND gate. First signal $U_{RES}$ is a reset signal coming from computer unit 3, which identifies a reset function of computer 3 in case of a low level, i.e., for example, when a reference potential is applied at the first input of logic circuit $N_1$. This means that computer 3, for example, is not or is no longer running. Second signal $U_{START}$ corresponds to a starter operation, i.e., for example, when a driver presses a starter button or turns an ignition key to the start position, a low level is provided as signal $U_{START}$. The output of first logic circuit $N_1$ is connected to a first input of a second logic circuit $N_2$, preferably a NAND gate. The first input of first logic circuit $N_1$, at which signal $U_{RES}$ is applied, is connected to the second input of second logic circuit $N_2$.

The output of first logic circuit $N_1$ and the output of second logic circuit $N_2$ are supplied to a storage device $N_3$, $N_4$ on the input side. Storage device $N_3$, $N_4$ preferably has two NAND gates, the output of third NAND gate $N_3$ preferably being connected to an input of a fourth NAND gate $N_4$ of the storage device. The output of fourth NAND gate $N_4$ is preferably connected to an input of third NAND gate $N_3$ of the storage device. The output of first logic circuit $N_1$ is preferably connected to an additional input of third NAND gate $N_3$ of storage device $N_3$, $N_4$. The output of second logic circuit $N_2$ is preferably connected to an additional input of fourth NAND gate $N_4$ of storage device $N_3$, $N_4$. An ohmic resistor $R_1$, for example of the magnitude of 10 k ohm, is preferably provided between the output of first logic circuit $N_1$ and the storage device, preferably of third NAND gate $N_3$. Between ohmic resistor $R_1$ and the input of the storage device, preferably of third NAND gate $N_3$, a parallel circuit made up of a capacitor $C_2$ and an ohmic resistor $R_2$ is preferably provided. The ohmic resistor preferably has a resistance value of 100 k ohm, and the capacitor preferably has a capacity of 2.2 nF. On the side facing away from the input of storage device $N_3$, $N_4$, resistor $R_2$ and capacitor $C_2$ are connected to a reference potential M, preferably ground.

An output of storage device $N_3$, $N_4$, preferably of fourth NAND gate $N_4$, is connected to the trigger input $E_T$ of a switching device T, preferably a field effect transistor (FET). Switching device T lies between reference potential M, preferably ground, and an output $A_{START}$ of an engine starter relay activation circuit (not shown in its entirety). Preferably, a diode D is provided between output $A_{START}$ of an engine starter relay 2 and switching device T, which only allows for a current flow in the direction of reference potential M. When activating switching device T via a potential at input $E_T$ of switching device T as a function of signals $U_{RES}$ and $U_{START}$, a current flow of a voltage source (not shown), having a higher potential than reference potential M, is provided via a starter relay activation winding (not shown), output $A_{START}$ of engine starter relay 2 and switching device T to reference potential M. Subsequently, starter relay 2 is pulled up, and the starter electric circuit (not shown) is closed for starting the engine.

Preferably, a diagnostic interface $U_{DI}$ is provided between output $A_{START}$ of engine starter relay 2 and switching device T, via which a diagnostic signal, preferably for detecting a drop out of starter relay 2, i.e. an interruption of a current flow through switching device T, or for the diagnosis of a short circuit to battery or to ground, can be transmitted to computer device 3. A capacitor $C_1$, which has a capacity of 4.7 nF for example, is preferably interposed between output $A_{START}$ of engine starter relay 2 and reference potential M.

According to the schematic block diagram in FIG. 1, in case of a triggered output stage reset, i.e. a low level, as potential $U_{RES}$ at a reset output of computer device 3, switching device T is activated, i.e. switched through, via signal $U_{START}$. Via potential $U_{DI}$ at the diagnostic interface of computer device 3, output $A_{START}$ of engine starter relay 2 can be diagnosed preferably via an analog port. The two logic circuits $N_1$ and $N_2$ as well as storage device $N_3$, $N_4$ are used for locking in the event of a low voltage reset, when the supply voltage of the computer device 2 falls below 5.5 V for example. Even in case of a battery voltage of 4 V, for example, triggering device T remains switched through due to storage device $N_3$, $N_4$, so that starter relay 2 remains pulled up. A latch device having a flip-flop as a state storage is thus provided.

In case of a reset, which can occur, for example, as the result of a failure such as a voltage drop with a weak battery, the trigger circuit having the two logic circuits $N_1$, $N_2$ and the storage device $N_3$, $N_4$ saves the current state of the signal level $U_{START}$ preferably in a flip-flop as storage device $N_3$, $N_4$ and thus maintains switch T in its current state. The locking is cancelled only as soon as computer device 2 has again taken control, completed its initialization and has again released the output stage reset in the form of a low level as signal $U_{RES}$. Regarding the control software, one should observe that signal $U_{START}$ has been set properly before computer device 3 has signaled the end of the initialization of computer device 3. This ensures that a starter relay 2 is triggered even at voltages below 6 V battery voltage, while switching device T is interrupted below approx. 1 V, and thus the activation circuit of engine starter relay 2 is definitely freed of current and voltage.

Although the present invention was described above in light of a preferred exemplary embodiment, it is not restricted to it, but is able to be modified in diverse ways. Thus, in addition to the exemplary implementation using NAND gates, another storage device is feasible as well as is an overall concept which allows for the same result using other logic components, for example an inverse logic. Moreover, all mentioned sizes, components or voltage ranges are to be regarded as examples.

| List of Reference Symbols | |
|---|---|
| 1 | Trigger circuit |
| 2 | Engine starter relay |
| 3 | Computer device |
| 4 | Operating device, preferably able to be operated manually by the driver |
| T | Switching device, preferably FET |
| D | Diode |
| $N_1$–$N_4$ | NAND gate |
| M | Reference potential, preferably (vehicle) ground |
| $C_1$, $C_2$ | Capacitor |
| $U_{DI}$ | Potential for diagnostic input of a computer device |
| $U_{RES}$ | Signal at reset output of a computer device |
| $U_{START}$ | Signal at operating device output |
| $R_1$, $R_2$ | Resistor |
| $A_{START}$ | Output to engine starter relay |
| $E_T$ | Trigger input of switching device |

What is claimed is:

1. A trigger circuit for an engine starter relay comprising:
   a switching device for switching an output of the engine starter relay to a reference potential and for activating the engine starter relay as a function of a trigger signal, which is applied at a trigger input of the switching device;

a first logic circuit for logically linking a first digital signal of a computer device and a second digital signal of an operating device;

a second logic circuit for logically linking an output signal of the first logic circuit to the first digital signal;

a storage device for temporarily storing a state at outputs of the first and second logic circuits, an output of the storage device being connected to the trigger input of the switching device; and a diode arranged between the switching device and an output of the engine starter relay, wherein the activation of the engine starter relay is ensured in the event that a supply voltage at the computer device falls below a specified value with a resulting activation of a reset signal.

2. The trigger circuit according to claim 1, wherein each of the first and second logic circuits includes a NAND gate.

3. The trigger circuit according to claim 1, wherein the switching device includes a FET.

4. The trigger circuit according to claim 1, wherein the storage device includes a flip-flop.

5. The trigger circuit according to claim 4, wherein the storage device includes two NAND gates.

6. The trigger circuit according to claim 5, wherein the flip-flop includes a third NAND gate connected on an input side to the output signal of the first logic circuit and to an output signal of a fourth NAND gate, the fourth NAND gate being connected on an input side to an output signal of the third NAND gate and to an output signal of the second logic circuit.

7. The trigger circuit according to claim 1, further comprising a capacitor situated between the output of the engine starter relay and the reference potential.

8. The trigger circuit according to claim 1, further comprising a first resistor situated between the output of the first logic circuit and an input of the storage device, and, behind the first resistor, a capacitor situated parallel to a second resistor between the input of the storage device and the reference potential.

9. The trigger circuit according to claim 1, wherein a signal output is provided as a diagnostic interface for the computer device between the output of the engine starter relay and the switching device.

10. The trigger circuit according to claim 1, wherein the trigger circuit is for activating an engine starter relay in a passenger car.

* * * * *